Aug. 18, 1953 — J. W. HETRICK — 2,649,311
SAFETY CUSHION ASSEMBLY FOR AUTOMOTIVE VEHICLES
Filed Aug. 5, 1952
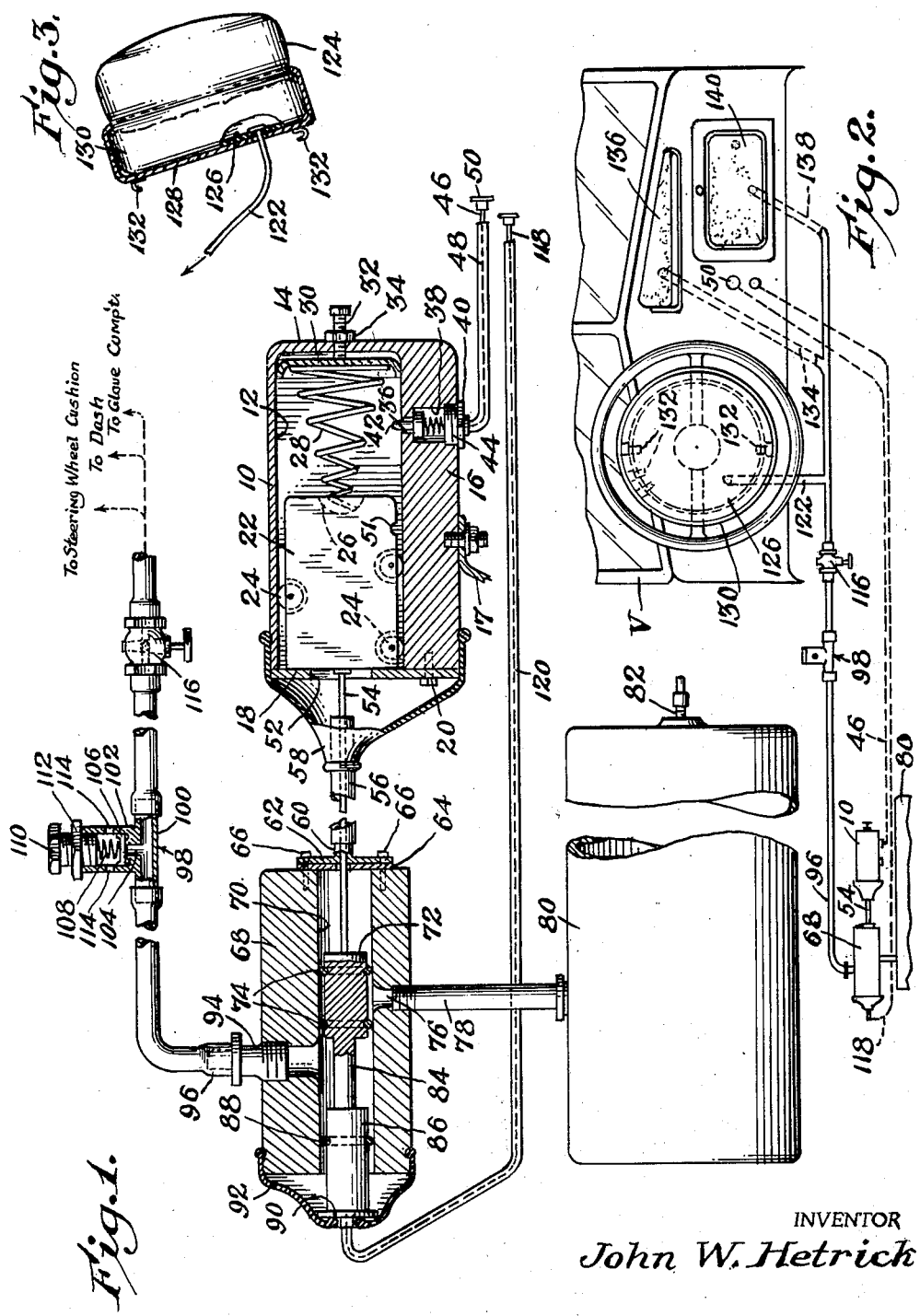
INVENTOR
John W. Hetrick
BY
McMorrow, Berman + Davidson
ATTORNEYS Patented Aug. 18, 1953

2,649,311

UNITED STATES PATENT OFFICE 2,649,311

SAFETY CUSHION ASSEMBLY FOR AUTOMOTIVE VEHICLES

John W. Hetrick, Newport, Pa.

Application August 5, 1952, Serial No. 302,839

5 Claims. (Cl. 280—150)

1

This invention relates to safety devices for automotive vehicles, and more particularly, has reference to an inflatable cushion assembly adapted to be mounted in the passenger compartment of a vehicle, and arranged to be inflated responsive to sudden slowing of the forward motion of the vehicle.

It is well appreciated that many persons suffer death or serious injury when hurled against an unyielding structural portion of an automotive vehicle, when the vehicle is involved in a collision or is braked suddenly and heavily to avoid a collision.

My main object, in devising an inflatable cushion assembly for automotive vehicles, is to provide a means whereby death or injury can be prevented, when a situation such as that described above occurs.

To this end, the inflatable cushion assembly which I have devised includes one or more cushions which are normally deflated so as to occupy a minimum space within the passenger compartment of the vehicle. The cushions are adapted to be inflated from an air accumulator or reservoir, which is mounted in the vehicle in the engine compartment or at some other location. A valve is interposed between the inflatable cushion or cushions and the air accumulator, and is normally closed, so as to keep the cushions normally deflated. However, means is associated with the valve which acts responsively to a sudden slowing of the forward motion of the vehicle, such as that occurring when the vehicle is involved in a collision or is braked heavily. This means is adapted to cause the valve to be immediately opened under conditions such as those described, thus to cause an instantaneous inflation of the cushion or cushions, to cause said cushions to define yielding surfaces against which a passenger may be thrust without incurring serious injury.

An important object of the present invention, in this connection, is to provide an inflatable cushion assembly of the type stated which will be so designed as to cause said cushions to be normally disposed out of the way, so that they will not interfere with normal operation of the vehicle or movement of the passengers within the vehicle.

Another object of importance is to provide an assembly of the type stated wherein the cushions can be provided in any number or shape, thus to permit one cushion, for example, to be mounted upon the steering wheel of the vehicle, another cushion to be mounted upon the glove compart-

2 ment of the vehicle, and a third cushion to be mounted upon the instrument panel of the vehicle. The construction, in this regard, permits additional cushions to be added wherever desired, as for example, along the back of the front seat.

Another object of importance is to provide a device of the type stated which can be mounted upon a vehicle as a separate accessory or attachment, without involving the modification or redesigning of any important structural parts of said vehicle.

Still another object of importance is to provide a device as stated which can be reset in a normally inoperative position from the interior of the passenger compartment, with maximum speed and ease.

Still another object is to provide a device of the type stated which, when manufactured in one form, can be used in any of various makes of vehicles, and can be mounted upon the vehicle with little difficulty.

A further object is to provide a safety cushion assembly which can be manufactured at low cost and from relatively inexpensive, readily available materials.

Other objects will appear from the following description, the claims appended thereto, and from the annexed drawing, in which like reference characters designate like parts throughout the several views, and wherein:

Figure 1 is a longitudinal sectional view through a safety cushion assembly formed in accordance with the invention, some parts being broken away, other parts being shown in side elevation, and still other parts being illustrated somewhat diagrammatically;

Figure 2 is a diagrammatic view showing the relationship of the several parts to structural parts of the vehicle disposed within the passenger compartment, said vehicle being illustrated fragmentarily; and Figure 3 is a sectional view taken diametrically through one of the cushions, said cushion being adapted for mounting upon the steering wheel of the vehicle.

Referring to the drawings in detail, the reference numeral 10 has been applied to a cylinder, said cylinder being adapted for mounting upon a selected structural member, not shown, of an automotive vehicle. The cylinder, for example, can be mounted within the engine compartment of the vehicle, so as to be disposed in an out-of-the-way location.

The cylinder 10 is formed with a longitudinal bore 12 closed at one end by an end wall 14, said end wall merging into a thickened side wall portion 16 extending from end to end of the cylinder at the underside thereof.

The cylinder 10 can be mounted upon a suitable bracket 17, which bracket would be connected fixedly to said structural part of the vehicle.

At its other end, the bore 12 is closed by a removable cap 18, said cap being connected to the side wall of the cylinder by screws 20 or equivalent fastening means.

Mounted within the bore 12, to shift longitudinally thereof, is a rollable weight 22, said weight being provided with rollers 24 contacting the side wall of the bore 12, thus to permit free movement of the weight 22 from end to end of the bore.

In that end of the weight 22 disposed adjacent the end wall 14 of the cylinder, there is formed a recess 26 receiving one end of a spring 28, the other end of which is engaged against a flanged plate 30 spaced selected distances from the end wall 14 by a tension-adjusting screw 32. The tension-adjusting screw 32 is threadable in the end wall 14, and is retained in selected positions of adjustment by means of a lock nut 34.

Formed in the thickened side wall portion 16 of the cylinder 10 is a transversely extended opening 36, said opening communicating at one end with the bore 12, and communicating at its other end with a counterbore 38. A threaded plug 40 is engaged in the counterbore, the counterbore having complementary threads, and carried slidably within the opening 36 is a detent 42, urged inwardly of the bore 12 by means of a spring 44. The spring 44 is circumposed about a stem secured to the detent, said stem being integrally formed as the inner end of an elongated, flexible cable 46 slidably mounted within a cable housing 48. At its outer end, the cable 46 has a knob 50 which, as shown in Figure 2, can be mounted upon the instrument panel of a vehicle V.

It will thus be seen that if the knob 50 is pulled, the detent 42 will be retracted within the opening 36, against the action of the spring 44.

The weight 22 has a recess 51 formed in its side wall, and if the weight 22 is shifted toward the right in Figure 1, the detent 42 will be cammed downwardly by the weight, and will then be urged into the recess 51 by the spring 44. Thus, the weight 22, when shifted to the right in Figure 1, will be releasably held in the position to which it is shifted by the detent. When, however, it is desired that the weight be returned to its normal position shown in Figure 1, the knob 50 is pulled, as a result of which the detent 42 is disengaged from the recess 51. The spring 28 will then urge the weight 22 to the left in Figure 1.

Formed in the cap 18 is a relatively large opening 52, and extending through said opening is a connecting rod 54, said connecting rod being fixedly attached at one end to the weight 22. The connecting rod 54 extends through a rod housing 56, and circumposed about one end of said housing is the smaller end of a flexible, cup-like boot 58 of soft rubber or similar material. The larger end of the boot 58 is engaged about the adjacent end of the cylinder 10.

At its other end, the cable housing 56 is attached to a boss 60 formed upon a plate 62 spaced away from the valve block by a gasket 64, fastening elements 66 being extended through the plate 62 and gasket 64 for attaching the same to the valve block. The valve block has been designated by the reference numeral 68 and is of relatively elongated formation, said block having an end to end, longitudinal bore 70.

Slidably mounted in the bore 70 is a valve member 72, said valve member being formed as an elongated cylindrical piston connected at one end to the rod 54. It will thus be seen that when the weight 22 is shifted to the right in Figure 1, it will carry with it the valve member 72.

Circumposed about the valve member 72, and spaced longitudinally of the valve member, are annular sealing rings 74, said rings having wiping engagement with the wall of the bore 70. The sealing rings 74 are disposed at opposite sides of a passage 76 communicating with the bore 70, when the valve member is in the normal, closed position thereof shown in Figure 1. The passage 76 is counterbored and threaded for a part of its length, for engagement therein of one end of a conduit portion 78, said conduit portion extending from an air accumulator 80 adapted to be charged with a supply of air pressure through a conventional valve 82.

Integral with the valve member 72 is a reduced extension 84, said extension merging into an outer end portion 86. The end portion 86 normally projects beyond one end of the valve block 68, as shown in Figure 1, and is provided with an annular sealing gasket 88.

At its outer, projecting end, the end portion 86 is flanged as at 90, and engaged over said flange is the smaller end of a flexible, rubber boot 92, the larger end of which is fitted about the adjacent end of the valve block 68.

Also formed in the valve block 68 is an outlet passage 94, offset longitudinally of the block from the passage 76. The outlet passage 94 is counterbored and threaded, to receive a fitting provided at the inlet end of a second conduit portion 96. The conduit portion 96 is provided, intermediate its ends, with a relief valve designated generally by the reference numeral 98.

Considering the construction of the relief or safety valve 98, it will be noted from Figure 1 that said valve is provided with a tubular body 100 integral, intermediate its ends, with a lateral projection 102. An inlet opening 104 is formed in the projection 102, communicating with the bore of the body 100.

A valve disc 106 is generally disposed in a position to close the opening 104, being urged against one end of the opening by a spring 108. The spring 108 is arranged for adjustment of the tension thereof, by a tension-adjusting screw 110 threaded in the outer end of the projection 102, and held in selected positions to which it is threaded by a lock nut 112.

Relief ports 114 are formed in the projection 102, intermediate the opposite ends of said projection, a pair of said relief ports being provided in the present instance, with the ports of said pair being diametrically opposite one another.

The purpose of the relief or safety valve 98 is to prevent rupture of the conduit extending from the accumulator to the safety cushion or cushions of the device, in the event the accumulator is charged with an excessive amount of air. When pressure within the conduit exceeds a predetermined amount, the relief valve will open against the action of the spring 108.

Also provided in the conduit between the air accumulator and the several protective cushions is a main valve 116, said main valve being of the manually operable type and being adapted to permit the entire device to be disposed in an inoperative position, whenever desired.

A reset cable 118 is provided, for resetting the control valve 72 whenever desired, said reset cable being connected to the end portion 86 and being extended through a housing 120. The reset cable 118 is provided with a knob adapted to be mounted upon the instrument panel of the vehicle, in close proximity to the knob 50. Should the device be accidentally tripped, causing inflation of the cushions, the reset knobs provided on cables 46, 118 can be pulled to return the parts to their normally inoperative position. Additionally, these knobs are pulled whenever the device has gone into operation under emergency conditions, and is to be reset for further use.

I provide, on the conduit extending from the air accumulator to the safety cushions, a plurality of branches, the number of said branches depending upon the number of cushions to be inflated. One branch has been designated by the reference numeral 122, and as shown in Figure 2, extends from the air conduit to an inflatable, generaly circular cushion 124 (Figures 2 and 3).

The cushion 124 has at its inner end an end wall 126 secured to the base of a cup-like receptacle 128, said receptacle having a peripheral flange 130 circumposed about the inner end portion of the cushion 124. Provided upon the base of the receptacle 128 are spaced clips 132, adapted to engage the conventional horn ring of the vehicle steering wheel.

It will thus be seen that the cushion 124 will be normally deflated, but when inflated under emergency conditions, will extend outwardly from the steering wheel toward the operator of the vehicle, to cushion the force with which said operator is thrown against the steering wheel in a collision.

I also provide a second branch 134, extending to an elongated, tapered safety cushion 136 mounted upon the instrument panel of the vehicle, to protect one seated next to the vehicle operator. A third branch 138 extends to a rectangular cushion 140 mounted upon the glove compartment door of the vehicle.

It will be readily appreciated that any number of branches can be provided upon the conduit, with said branches leading to cushions located at desired places within the vehicle, and formed to appropriate shapes.

When a collision occurs, or when it is necessary to brake the vehicle suddenly, the weight 22 will tend to continue its forward motion, despite the fact that the forward motion of the vehicle has been stopped or greatly slowed. As a result, the weight 22 will shift to the right in Figure 1, against the action of the spring 28, and this will cause the valve member 72 to move out of its normal position, in which normal position it closes the passage 76. When the valve member is moved from its normal position, the reduced portion 84 will be disposed above the passage 76, and will permit the free movement of air from the air accumulator 80 to one or more safety cushions provided in the device.

When the weight 22 has been shifted to the right in Figure 1, it will be held in the position to which it is shifted by the detent 42, until such time as the device is to be reset for further use. At that time, the knobs provided on cables 46, 118 are pulled and the valve member and weight 22 will be returned to their proper locations within the valve block and cylinder 10, respectively.

It will also be understood that the air accumulator 80 will be normally charged with a suitable quantity of air under pressure, and it is obvious that the air accumulator can be readily filled from the ordinary air pumps provided in a service station.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A safety cushion assembly for automotive vehicles comprising: normally stationary means arranged to shift in position responsive to a predetermined deceleration of a vehicle; a normally closed valve connected to said means to move to open position on shifting of said means; an air accumulator; at least one inflatable cushion adapted for mounting within a vehicle; and a conduit extending between said accumulator and cushion and normally closed by the valve, for passage of air from the accumulator to the cushion for inflating the same responsive to opening of the valve.

2. A safety cushion assembly for automotive vehicles comprising: a cylinder adapted to be mounted upon a vehicle; a weight within the cylinder and shiftable longitudinally thereof responsive to deceleration of said vehicle; a normally closed valve connected to said weight to move to open position on shifting of said weight; an air accumulator; at least one inflatable cushion adapted for mounting within said vehicle; and a conduit extending between said accumulator and cushion and normally closed by the valve, for passage of air from the accumulator to the cushion for inflating the same responsive to opening of the valve.

3. A safety cushion assembly for automotive vehicles comprising: a cylinder adapted to be fixedly mounted on a vehicle; a weight within the cylinder and shiftable longitudinally thereof in one direction responsive to sudden slowing of the forward motion of said vehicle; yielding means interposed between the weight and one end of the cylinder and arranged to normally urge the weight in an opposite direction; a normally closed valve connected to said weight to move to open position on shifting of the weight in said one direction; an air accumulator; at least one inflatable cushion adapted for mounting within said vehicle in the passenger compartment thereof; and a conduit extending between said accumulator and cushion and normally closed by the valve, for passage of air from the accumulator to the cushion for inflating the same responsive to opening of the valve.

4. A safety cushion assembly for automotive vehicles comprising: a cylinder adapted to be fixedly mounted on a vehicle; a weight mounted within the cylinder to shift longitudinally thereof in one direction responsive to sudden slowing of the forward motion of said vehicle; yielding means interposed between the weight and one end of the cylinder and arranged to normally urge the weight in an opposite direction; a manually releasable latch in the cylinder adapted to engage the weight after movement thereof in said one direction; a normally closed valve connected to said weight to move to an open position on shifting of the weight in said one direction; an air accumulator; at least one inflatable cushion adapted for mounting within said vehicle in the passenger compartment thereof; and a conduit extending between said accumulator and cushion and normally closed by the valve, for passage of air from the accumulator to the cushion to inflate the same responsive to opening of the valve.

5. A safety cushion assembly for automotive vehicles comprising: a cylinder adapted to be fixedly mounted on a vehicle; a weight mounted within the cylinder to shift longitudinally thereof in one direction responsive to sudden slowing of the forward motion of said vehicle; yielding means interposed between the weight and one end of the cylinder and arranged to normally urge the weight in an opposite direction; a manually releasable latch in the cylinder adapted to engage a weight after movement thereof in said one direction; a valve block adapted to be mounted in said vehicle adjacent the cylinder and having a longitudinal bore; a valve member connected to said weight and mounted in the bore of the valve block to shift longitudinally thereof in one direction on shifting of the weight in said one direction, said block having a passage communicating with said bore and normally closed by the valve, said valve being arranged to open said passage on shifting of the valve in said one direction within its associated bore; an air accumulator; at least one inflatable cushion adapted for mounting within said vehicle in the passenger compartment thereof; and a conduit extending between said accumulator and cushion and including said passage, said conduit being normally closed by the valve and being adapted when opened to permit passage of air from the accumulator to the cushion for inflating the cushion responsive to opening of the valve.

JOHN W. HETRICK.

References Cited in the file of this patent

UNITED STATES PATENTS

| Number | Name | Date |
|---|---|---|
| 2,181,161 | Wolf | Nov. 28, 1939 |
| 2,560,009 | Straith | July 10, 1951 |

FOREIGN PATENTS

| Number | Country | Date |
|---|---|---|
| 769,903 | France | June 18, 1934 |